United States Patent
Chang et al.

(10) Patent No.: US 6,263,014 B1
(45) Date of Patent: Jul. 17, 2001

(54) METHOD AND APPARATUS FOR CORRELATION DETECTION OF MULTI-LEVEL SIGNALS WITH NON-STANDARD DEVIATIONS

(75) Inventors: Chun-Ye Susan Chang, Boynton Beach; Clinton C Powell, II, Lake Worth; Craig P. Wadin, Sunrise, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/145,956

(22) Filed: Sep. 3, 1998

(51) Int. Cl.$^7$ .................................................. H04B 15/00
(52) U.S. Cl. ........................... 375/210; 375/150; 370/232
(58) Field of Search ............................. 375/20, 286, 293, 375/210, 150; 370/232; 455/503

(56) References Cited

U.S. PATENT DOCUMENTS

| | | | | |
|---|---|---|---|---|
| 4,571,735 | * | 2/1986 | Furse | 375/20 |
| 5,208,833 | * | 5/1993 | Erhart et al. | 375/20 |
| 5,670,951 | | 9/1997 | Servillo et al. | 340/825.44 |
| 5,960,042 | * | 9/1999 | Chang et al. | 375/293 |
| 6,055,436 | * | 4/2000 | Powell, II et al. | 455/503 |
| 6,078,627 | * | 6/2000 | Grayford | 375/286 |
| 6,111,855 | * | 8/2000 | Chang et al. | 370/232 |

\* cited by examiner

*Primary Examiner*—Stephen Chin
*Assistant Examiner*—Tony Al-Beshrawi
(74) *Attorney, Agent, or Firm*—Randi L. Dulaney

(57) ABSTRACT

A method (200) of decoding a multi-level synchronous protocol having a first portion encoded as M/2-level signals and a subsequent portion encoded as M/2-level signal or M-level signals, wherein the M/2-level signals have expected larger than normal variation of deviations includes steps of decoding (202) the first portion using a biased mode which uses M correlators shifted (204) to adequately cover the frequency range of the expected larger than normal variation of deviations and determining (206) from decoding of the first portion whether the subsequent portion is the M/2-level or M-level signal. If a M/2-level signal is found, continue decoding (210) in the biased mode. If it's the M-level signal, then decoding continues in standard mode (214), which uses M correlators that are spaced in frequency to match M spectral deviations within a predetermined frequency range.

15 Claims, 4 Drawing Sheets

METHOD AND APPARATUS FOR CORRELATION DETECTION OF MULTI-LEVEL SIGNALS WITH NON-STANDARD DEVIATIONS

FIELD OF THE INVENTION

The present invention is directed to correlation detection and more particularly to a correlator and method capable of accurately detecting signals with non-standard frequency deviations.

BACKGROUND OF THE INVENTION

The Maximum Likelihood Detector which is also known as the Optimum Noncoherent Detector (or correlation detector) for detecting frequency shifted keyed (FSK) signals in an additive white gaussian noise channel is well known. The performance of a correlation detector can also be achieved with other detector architectures such as a Matched Filter or a Fast Fourier Transform (FFT). These detectors have the ability to achieve a significant sensitivity improvement (i.e., 4 dB) over that of discriminators for M-level orthogonal signaling (i.e. FLEX™). However, when 2-level FLEX™ or POCSAG signals with Non-Standard deviations occur on the channel, severe degradations can occur. For 2 level FLEXT™ or POCSAG signaling, only the outer correlator bins of the correlator detector as shown in FIG. 1 are necessary for detection. However the 2 inner correlators are often used as well (see FIG. 2) while only passing the most significant bit (MSB) of the symbol decision to the decoder.

Older systems such as those being used for POCSAG or Golay may have transmitters with poor deviation accuracy. Even though the POCSAG protocol states that the nominal deviations are +/-4500 Hz, measurements in the field have shown that they may vary anywhere from +/-2600 Hz to +/-5400 Hz as shown in FIG. 3. These same (Pocsag) systems are often used to initially transmit 2-level FLEX™ signals until capacity warrants them moving to 4-level. Even using all 4 correlators as shown in FIG. 2 would result in severely degraded performance if the deviations of the transmitter where at or near +/-3200 Hz. What is needed is a method which does not allow the degradation to occur when 2-level signaling is on the channel, but rather minimizes or removes the degradation allowing for the maximum improvement offered by use of the correlation detector in spite of the possibility of Non-Standard deviations existing on the channel.

DESCRIPTION OF A PREFERRED EMBODIMENT

Figure 1:
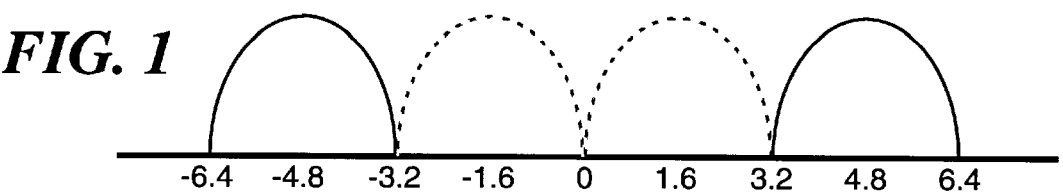
FIG. 1 is a frequency diagram illustrating current correlator settings for 2-level frequency modulated (FM) systems such as POCSAG or FLEX™ at 1600 symbols per second.
Figure 2:
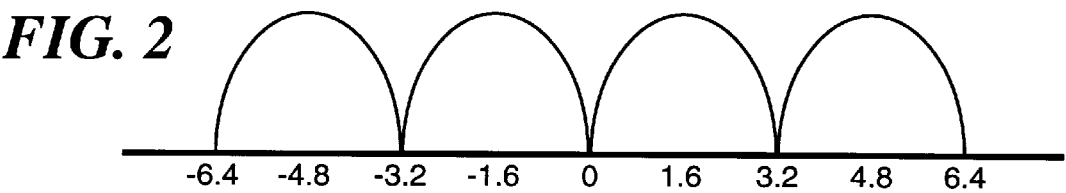
FIG. 2 is another frequency diagram illustrating current correlator settings for 4-level FM systems such as FLEX™ at 1600 symbols per second.

A correlation detector capable of handling both 2-level POCSAG and 2 or 4 level FLEX™ is preferably implemented using 4 time domain correlators whose equivalent spectral coverage is shown in FIG. 2 (for 1600 symbols per second (sps)). Furthermore each of the correlators window lengths are set nominally to 1-symbol length (15 samples).

Figure 3:
FIG. 3 is another frequency diagram illustrating the range of deviations for non-standard 2-level FM systems such as POCSAG.
Figure 4:
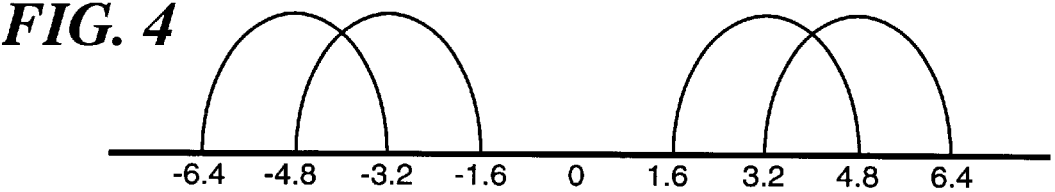
FIG. 4 is a frequency diagram illustrating biased correlator settings in accordance with the present invention for 2-level FM systems such as POCSAG or FLEX™ at 1600 symbols per second.

In the case of FLEX™, storing the samples for generating the 1600 Hz complex tone makes all other integer multiples (3200, 4800, 6400 . . . ) of that frequency available by simply indexing through the samples differently. This in turn allows for the correlators to correlate to any of those frequencies. Therefore, the correlators can be programmed to correlate to different frequencies at different times. For 2-level signaling, where Non-Standard deviations may exist, the nulling region centered around 3200 Hz can be completely eliminated by setting the two inner correlators to correlate against +/-3200 Hz while the Outer correlators remain at +/-4800 Hz as shown in FIG. 4. In doing so one can cover the expected deviation variations shown originally in FIG. 3. For 4-level signaling the correlators are programmed as shown in FIG. 2.

Figure 5:
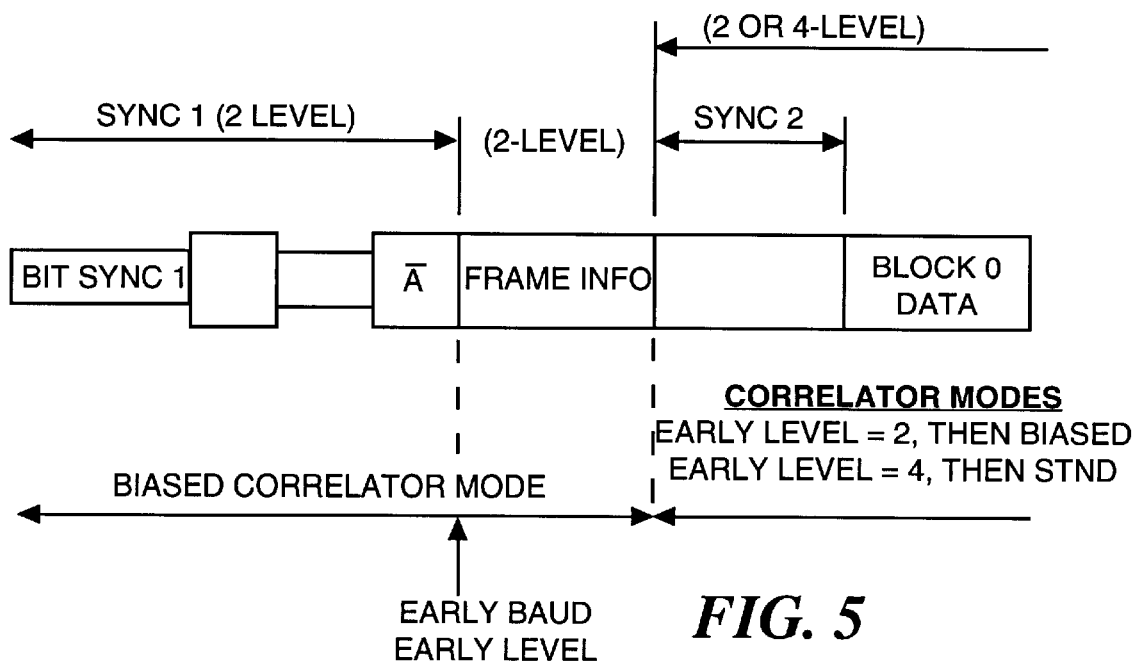
FIG. 5 illustrates a portion of a FLEX™ frame with correlator mode selection in accordance with the present invention.

Various modes of operation must be accounted for in a correlator detector that can decode both 2 and 4-level FLEX ™ as well as POCSAG. Typically, there are 3 modes of operation: Cold Start, Synchronous and Asynchronous operation. For reference a partial FLEX™ frame with the correlator modes is shown in FIG. 5.

In a cold start mode the correlators come up in a biased correlator mode shown in FIG. 4. The radio preferably starts out immediately performing an A-word search. A-word is in the Sync 1 field of the FLEX™ frame which is 2-level FM signaling. If A-word correlation is achieved, then at the beginning of Frame Info word the Early Level signal (which indicates whether the Sync2 field following the Frame Info word and the data in the remainder of the Frame is 2-level or 4-level) and the Early Baud signal (which indicates whether the Sync2 field following the Frame Info word and the data in the remainder of the Frame is 1600 sps or 3200 sps) is then used to set the correlator mode starting at the beginning of the Sync2 field. If Early Level indicates either of the 2-level signaling modes, then the correlators remain in the Biased Correlator settings (FIG. 4) corresponding to the Early Baud signal. If the Early Level signal indicates 4-level signaling then the correlators are set to the Standard Correlator settings (FIG. 2) corresponding to the Early Baud signal. If A-word correlation is not achieved within a programmed amount of time the radio then goes into an Asynchronous mode.

When the radio falls into Asynchronous mode the correlators are set to the Standard Correlator mode. During Asynchronous mode, baud detect is being performed to check to see if there is any desirable signaling present on the channel. If baud detect is successful, then the correlators are put into the Biased Correlator mode shown in FIG. 4, A-word search is initiated and it continues on as in the Cold Start mode. If baud detect fails, it then goes to sleep and retries at various intervals. If after a programmed number of baud detect attempts baud still fails, then the correlators are put into the Biased Correlator mode and Cold Start mode is initiated.

In Synchronous mode, the correlators are preferably put into the Biased Correlator mode shown in FIG. 4 each time the radio is expecting the start of a frame. A-word search is initiated and it continues as described in the Cold Start mode.

Additionally when using the Biased Correlator Mode for 2-level signaling, a simulcast delay spread (SDS) performance improvement is also achieved without trading off sensitivity as is usually the case. For example in 3200 sps/2-level FLEX™ signaling with 126 used of differential delay, the paging call rate increases from 39% in Standard Correlator Mode to 96% in Biased Correlator Mode. A similar improvement can be expected in 1600 sps/2-level FLEX™ signaling as well.

A method for handling Non-Standard 2-level deviations has been described which allows the correlator detector to recover the data with little or no sensitivity degradation when compared to using the standard correlator detector settings. Furthermore this method does not degrade the correlator detectors recovery for standard deviation 2-level transmissions while additionally improving the simulcast performance for 2-level signaling.

Figure 6:
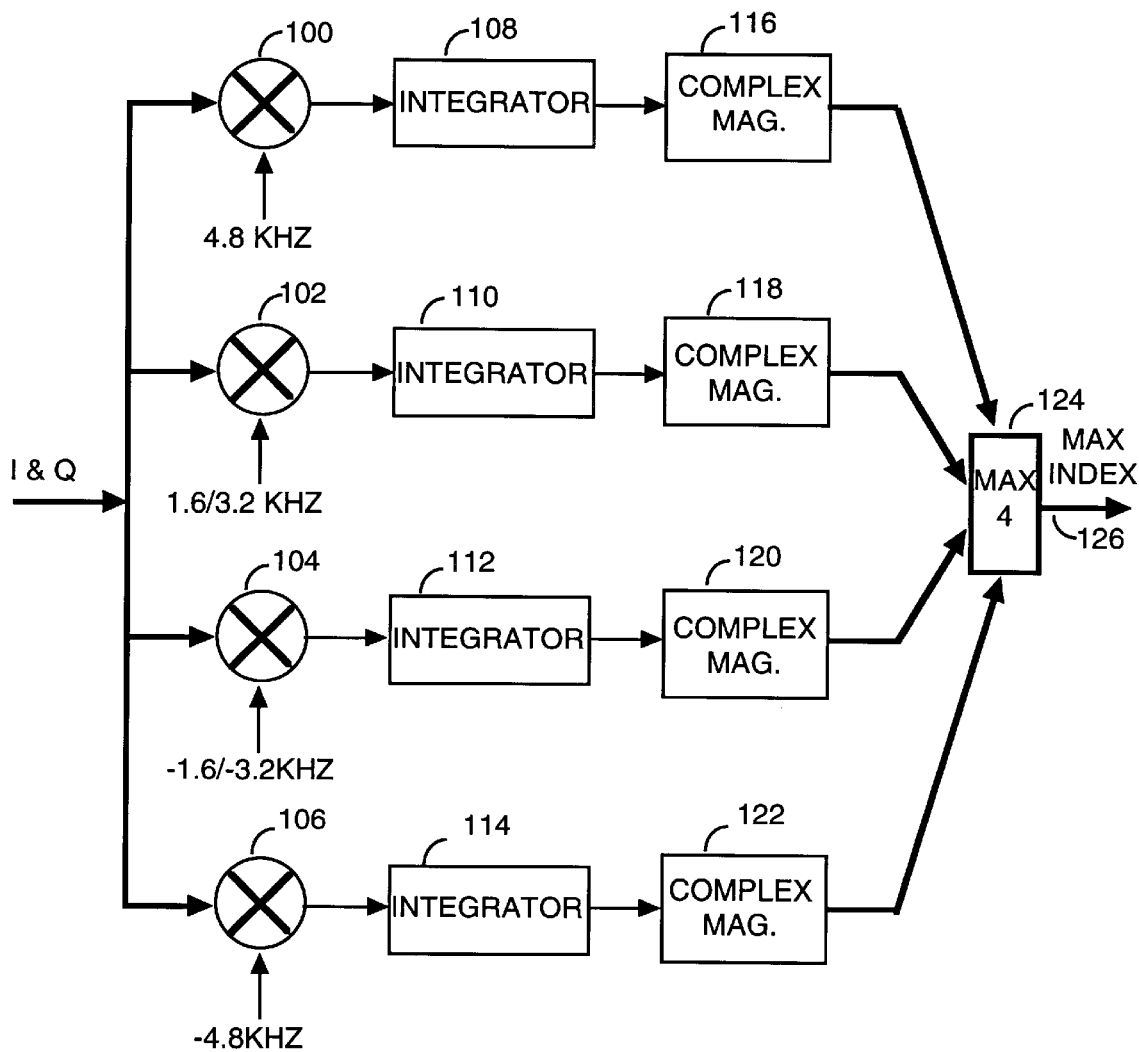
FIG. 6 is a block diagram of a correlator in accordance with the present invention.

Referring to FIG. 6, a dynamically shifting correlator 36 for detecting M-level signals or M/2-level signals preferably comprises a plurality of complex multipliers (100, 102, 104, and 106) for multiplying an M-level signal in a standard mode at a first set of M predetermined frequency deviations (±4.8 kHz and ±1.6 kHz in example shown in FIG. 2) and for multiplying an M/2-level signal in a biased mode at a second set of M predetermined frequency deviations (±4.8 kHz and ±3.2 Hz in example shown in FIG. 4). The correlator 36 further preferably comprises a plurality of corresponding integrators (108, 110, 112, and 114) (preferably in the form of boxcar filters) for integrating a signal power plus noise signal from the plurality of complex multipliers. Additionally, the correlator 36 comprises a plurality of corresponding magnitude functions (116, 118, 120 and 122) for computing the cross correlation power over a predetermined window. Finally, the correlator 36 comprises a processor 124 programmed to select a symbol (126) with the maximum cross-correlation power at a clock recovery sampling instance using a sync clock.

Figure 7:
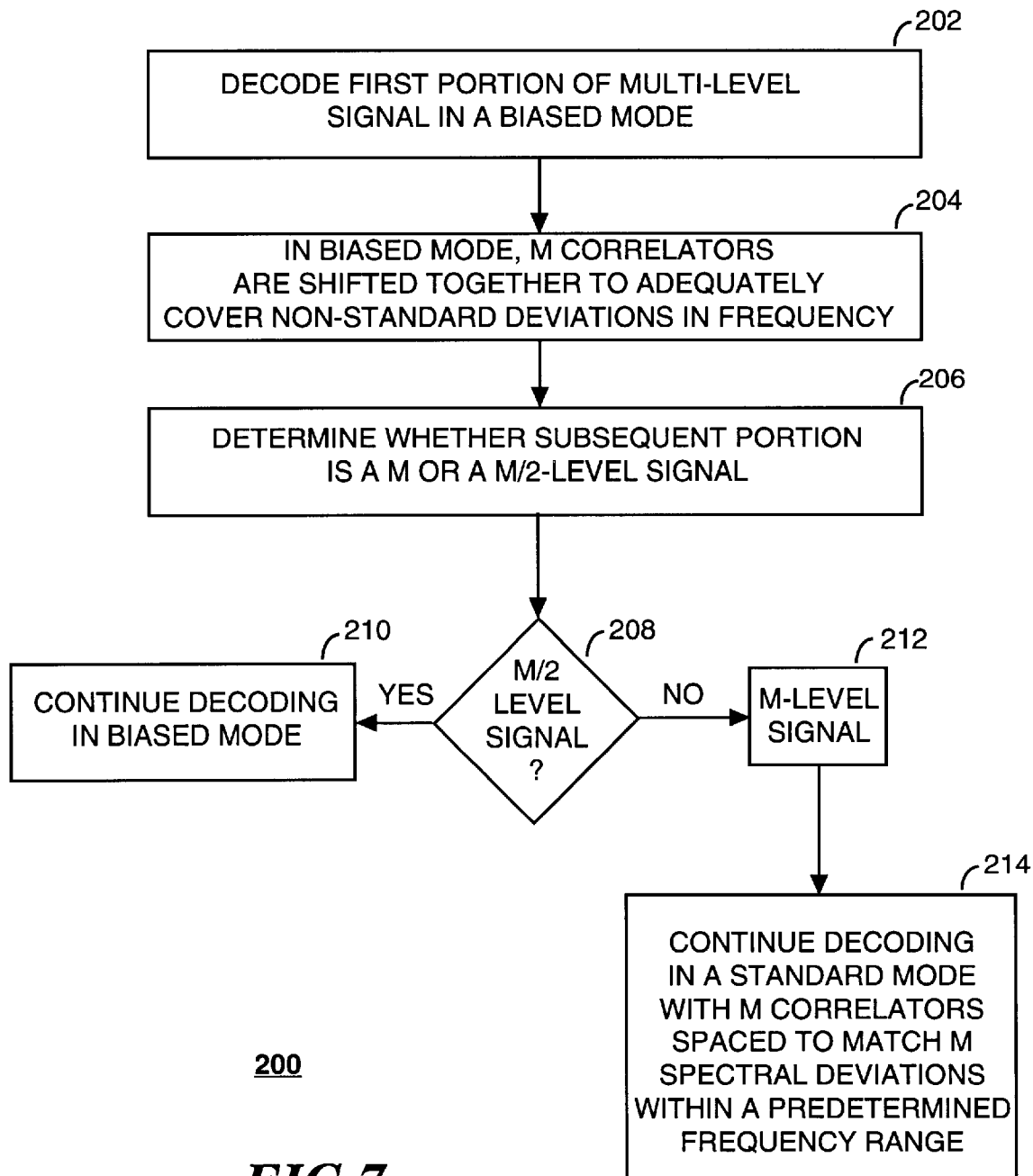
FIG. 7. is a flow chart illustrating a method decoding a multi-level synchronous protocol in accordance with the present invention.

Referring to FIG. 7, a flow chart is shown illustrating a method 200 of decoding a multi-level synchronous protocol, wherein signals encoded in the protocol have a first portion encoded as M/2-level signals and a subsequent portion encoded as M/2-level signal or M-level signals, wherein the M/2-level signals have expected larger than normal variation of deviations from mean frequency values. The method 200 preferably comprises the step 202 of decoding the first portion using a biased mode, wherein a correlation detector in the biased mode has M correlators shifted (preferably together) at step 204 to adequately cover the frequency range of the expected larger than normal variation of deviations. For example, this can be achieved by shifting a set of M/2 inner correlators to overlap in frequency a set of M/2 outer correlators or alternatively by shifting a set of M/2 outer correlators to overlap in frequency a set of M/2 inner correlators. At step 206, a determination is made from the decoding of the first portion as to whether the subsequent portion is the M/2-level signal or the M-level signal. At decision block 208, if the subsequent portion is the M/2-level signal, the method 200 continues to decode in the biased mode as shown at block 210. If at decision block 208, the signal is not a M/2-level signal, then it is very likely to be a M-level signal as shown at block 212, wherein the method 200 then continues to decode in a standard mode at step 214 wherein the standard mode uses M correlators that are spaced in frequency to match M spectral deviations within a predetermined frequency range. The process of decoding further comprises the step of choosing a correlator among the M correlators that has a maximum energy level preferably using a maximum likelihood decision.

In a more specific aspect of the present invention, the method described above involves receiving multi-level synchronous signals with non-standard frequency deviations with a correlation detector having a set of outer correlators and a set of inner correlators. The method should initially determine a frequency range of non-standard deviations in a received signal and then shift at least one of the set of outer correlators or the set of inner correlators to overlap each other to adequately cover the frequency range of non-standard deviations. This preferably means shifting the set of inner correlators to overlap the set of outer correlators in one instance, but it can also mean shifting the set of outer correlators to overlap the set of inner correlators in another instance or even shifting both sets towards each other in yet another example.

Figure 8:
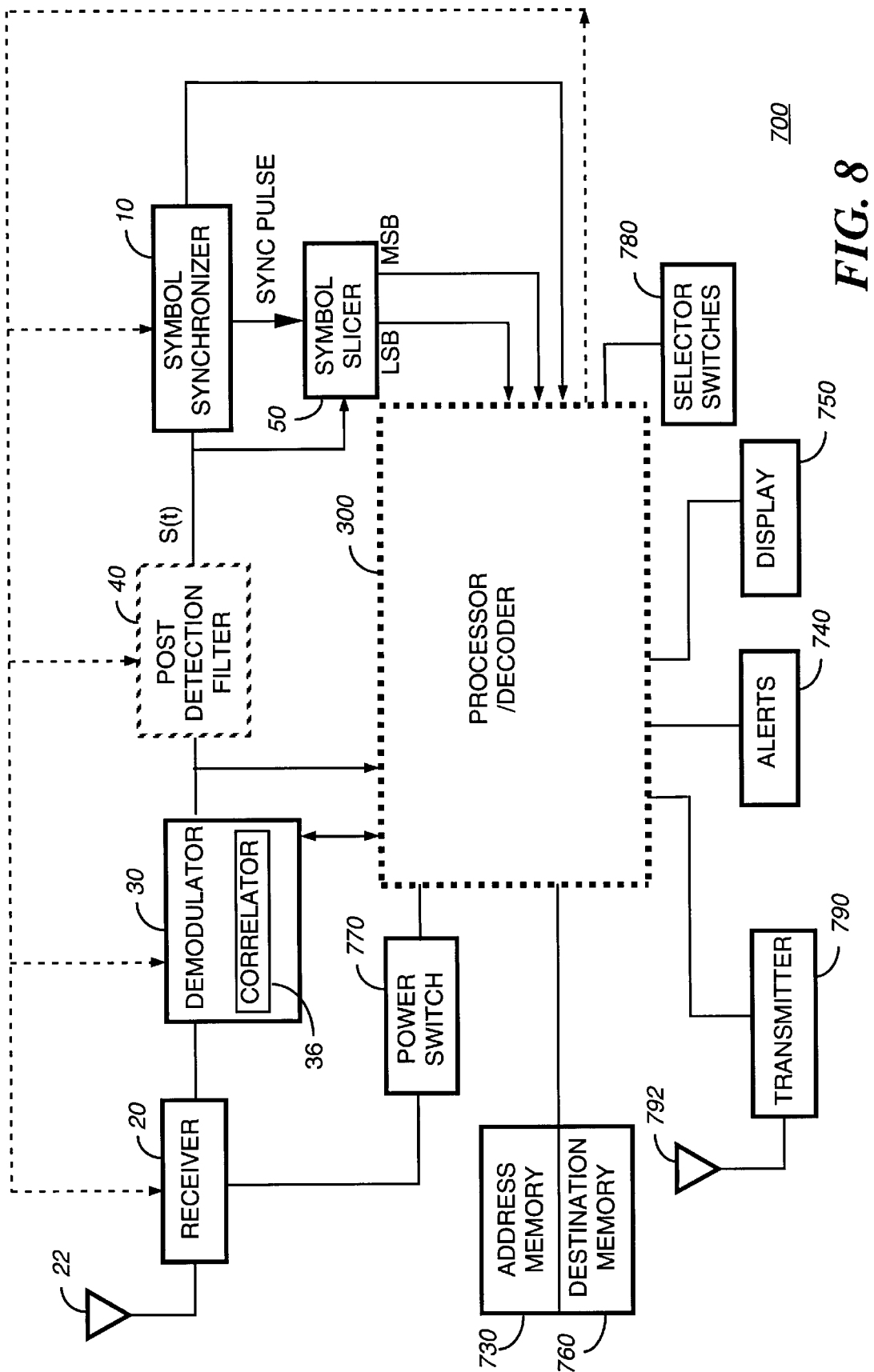
FIG. 8 is a block diagram of a selective call transceiver having a correlator in accordance with the present invention.

FIG. 8 illustrates a selective call receiver unit (such as a pager) 700 utilizing a circuit capable of receiving and decoding multi-level signals in the form of M-level signals or M/2-level signals having non-standard deviations which preferably comprises a demodulator or detector 30 (that preferably has multiple correlators for multi-level symbols) among other things. The selective call receiver 700 further comprises a processor/decoder 300 that controls many of the functions required in a selective call receiver such as decoding. It should be understood that the functions of synchronizing, decoding, and baud detecting could be achieved through the use of the processor or respective stand-alone synchronizer, decoder, and detector circuits without the use of the processor 300.

The selective call receiver unit 700 preferably comprises a receiver 20 for receiving radio frequency (RF) signals detected by antenna 22. The received signal output by the receiver 20 is connected to the detector or demodulator 30 having a correlator circuit 36. The demodulator 30 optionally outputs the demodulated signal to a post detection filter (PDF) 40, which ultimately outputs a filtered demodulated signal S(t) to a symbol synchronizer 10 and symbol slicer 50. The demodulator 30 also provides an output signal to the processor/decoder 300. The symbol synchronizer 10 issues sync pulses to control when a symbol slicer 50 samples the filtered demodulated signal S(t) in order to compare the level of the demodulated signal (which may be digital or analog) with predetermined thresholds to output corresponding digital data, such as 2 level data ("0" or "1"), 4 level data ("00", "01", "11" or "10"), or in general M-level data. The symbol synchronizer 10 preferably examines the slope of the demodulated signal S(t) for transitions between various levels (when using the optional PDF 40) such as shown in the method and apparatus described in a U.S. patent application Ser. No. 08/962,267 by Powell et al., entitled Symbol Synchronizer Based on Eye Pattern Characteristics Having Variable Adaption Rate and Adjustable Jitter Control and Method Therefor, or when not using the PDF 40 as shown in the U.S. patent application Ser. No. 09/076,992 by Powell et al., entitled Method and Apparatus for Accurate Synchronization Using Symbol Decision Decision Feedback, both of which are assigned to the assignee of the present invention and hereby incorporated by reference. However, it should be appreciated by those with ordinary skill in the art that the techniques and circuitry is applicable to any M-level FM signal and that other techniques may be used with the present invention.

The processor 300 is a controller which may include a decoder function that decodes the digital data in accordance with protocol rules established for example, by Motorola's FLEX™ paging protocol. For example, the decoder outputs corresponding address information, message information and/or control information. The processor 300 preferably incorporates the decoder function and is the control point for the selective call receiver unit 700. Among other things, the processor 300 may control the receiver 20, demodulator 30, as well as the correlator 36. The processor 300 compares received address information with predetermined addresses stored in an address memory 730 in order to trigger one of the alerts 740 or to display a received text or graphics message on display 750. In addition, messages are preferably stored in a destination memory 760. The processor 300 may also include buffer memory (not shown) for storing previous symbol decisions or phase values. The processor 300 also is connected to a power switch 770 to shut down the receiver 20 and other components of the selective call receiver during periods of time when the particular selective call receiver is not expected to receive information. A user interface to the selective call receiver unit 700 is achieved through selector switches 780. The selective call receiver unit may also have acknowledge-back or reverse channel transmitting capability, and accordingly may comprise a transmitter 790 and a transmitting antenna 792.

The series of equations and algorithms used in the processor 300 above can be implemented in many ways, such as by hardware circuits, a digital signal processor, computer software, microprocessor instructions, etc. Those with ordinary skill in the art will appreciate that other methods, in addition to those mentioned, are equally suitable. All or some of the circuits shown as part of selective call receiver including the proccessor 300 can be integrated onto a single application specific integrated circuit (ASIC), together with other signal processing functionalities.

The above description is intended by way of example only and is not intended to limit the present invention in any way except as set forth in the following claims.

What is claimed is:

1. A method of decoding a multi-level synchronous protocol wherein signals encoded in the protocol have a first portion encoded as M/2-level signals and a subsequent portion encoded as M/2-level signal or M-level signals, wherein the M/2-level signals have expected larger than normal variation of deviations from mean frequency values, the method comprising:
   decoding the first portion using a biased mode, wherein a correlation detector in the biased mode has M correlators shifted to adequately cover the frequency range of the expected larger than normal variation in deviations;
   determining from the decoding of the first portion whether the subsequent portion is the M/2-level signal or the M-level signal; and
   if the subsequent portion is the M/2-level signal, continue decoding in the biased mode.

2. The method of claim 1, wherein the method further comprises the step of continuing to decode in a standard mode if the subsequent portion is the M-level signal, wherein the standard mode uses M correlators that are spaced in frequency to match M spectral deviations within a predetermined frequency range.

3. The method of claim 1, wherein the step of decoding in the biased mode further comprises the step of shifting a set of inner correlators to overlap in frequency a set of outer correlators.

4. The method of claim 1, wherein the step of decoding in the biased mode further comprises the step of shifting a set of M/2 inner correlators to overlap in frequency a set of M/2 outer correlators.

5. The method of claim 1, wherein the multi-level synchronous signal is a 2-level frequency modulated signal and wherein the step of decoding in the biased mode includes the step of shifting a set of two inner correlators to overlap in frequency a set of two outer correlators.

6. The method of claim 1, wherein the method further comprises the step of choosing a correlator among the M correlators that has a maximum energy level using a maximum likelihood decision.

7. A method of receiving multi-level synchronous signals with non-standard deviations from mean frequency values with a correlation detector having a set of outer correlators and a set of inner correlators, comprising the steps of:
   determining a frequency range of non-standard deviations in a received signal; and
   shifting at least one of the set of outer correlators or the set of inner correlators to overlap each other to adequately cover the frequency range of non-standard deviations.

8. The method of claim 7, wherein the step of shifting further comprises the step of shifting the set of inner correlators to overlap the set of outer correlators.

9. The method of claim 7, wherein the multi-level synchronous signal is a 2-level frequency modulated signal and wherein the step of shifting includes the step of shifting a set of two inner correlators to overlap a set of two outer correlators.

10. A selective call receiver unit capable of receiving and decoding multi-level signals in the form of M-level signals or M/2-level signals having non-standard deviations, wherein the selective call receiver unit comprises:
    a selective call receiver;
    a demodulator coupled to the selective call receiver; and
    a programmable correlator coupled to the demodulator, wherein the correlator has M correlators spaced in frequency for detecting M-level signals in a standard mode at M predetermined spectral deviations within a predetermined frequency range and for detecting M/2-level signals in a biased mode at M frequency intervals shifted to accommodate the non-standard deviation of the M/2-level signals.

11. The method of claim 10, wherein each of the multi-level signals have a first portion encoded as a M/2-level signal and a subsequent portion encoded as either a M/2-level signal or a M-Level signal and wherein the programmable correlator is programmed to decode the first portion using a biased mode, wherein the programmable correlator in the biased mode has M correlators shifted to adequately cover the frequency range of the non-standard deviations of the M/2-level signals.

12. The method of claim 11, wherein the programmable correlator is further programmed to determine from the first portion whether the subsequent portion is the M/2-level signal or the M-level signal.

13. The method of claim 12, wherein the method further comprises the step of continuing to decode in the biased mode if the subsequent portion is the M/2-level signal.

14. The method of claim 12, wherein the method further comprises the step of continuing to decode in a standard mode if the subsequent portion is the M-level signal, wherein the standard mode uses M correlators that are spaced in frequency to match M spectral deviations within a predetermined frequency range.

15. The method of claim 10, wherein the step of decoding in the biased mode further comprises the step of shifting a set of inner correlators to overlap in frequency a set of outer correlators.

* * * * *